US010559945B1

(12) United States Patent
Najar, Jr. et al.

(10) Patent No.: US 10,559,945 B1
(45) Date of Patent: Feb. 11, 2020

(54) INSULATIVE BOOTS AND POWER DISTRIBUTION ASSEMBLIES

(71) Applicant: Siemens Industry, Inc., Alpharetta, GA (US)

(72) Inventors: Peter Najar, Jr., Arlington, TX (US); Thomas W. Hawkins, Arlington, TX (US)

(73) Assignee: SIEMENS INDUSTY, INC., Alpharetta, GA (US)

(*) Notice: Subject to any disclaimer, the term of this patent is extended or adjusted under 35 U.S.C. 154(b) by 0 days.

(21) Appl. No.: 16/118,040

(22) Filed: Aug. 30, 2018

(51) Int. Cl.
*H02B 1/01* (2006.01)

(52) U.S. Cl.
CPC .............. *H02B 1/013* (2013.01); *H02B 1/012* (2013.01)

(58) Field of Classification Search
CPC .......... H02B 13/025; H02B 1/38; H02B 1/28; H02B 1/30; H02B 1/565; H02B 11/26; H02B 13/02; H02B 1/14; H02B 13/045; H02B 1/06; H02B 1/56; H02B 11/24; H02B 13/035; H02B 1/056; H02B 1/306; H02B 1/36; H02B 11/133; H02B 1/202; H02B 1/308; H02B 3/00; H01H 9/22; H01H 9/0264; H01H 33/022
See application file for complete search history.

(56) References Cited

U.S. PATENT DOCUMENTS

| | | | | |
|---|---|---|---|---|
| 3,278,698 A * | 10/1966 | Metz | ......................... | H02B 1/36 200/50.17 |
| 3,924,161 A | 12/1975 | Olashaw et al. | | |
| 4,374,405 A | 2/1983 | Olashaw et al. | | |
| 4,740,864 A | 4/1988 | Stanfield et al. | | |
| 4,979,906 A * | 12/1990 | Shrout | .................... | H02G 5/007 174/88 B |
| 6,020,558 A * | 2/2000 | Wilkie, II | ................. | H02B 1/20 174/373 |
| 6,040,976 A | 3/2000 | Bruner et al. | | |
| 6,111,745 A | 8/2000 | Wilkie et al. | | |
| 6,312,068 B1 * | 11/2001 | Benner | ................... | H02B 1/308 312/111 |
| 6,325,675 B1 * | 12/2001 | Harmeyer | .......... | H01R 13/5213 439/709 |
| 6,435,888 B1 * | 8/2002 | Reed, Jr. | ................... | H01R 4/30 174/88 B |
| 6,603,075 B1 | 8/2003 | Soares et al. | | |
| 6,870,103 B1 * | 3/2005 | Wiant | .................... | H02G 5/007 174/68.2 |
| 6,888,066 B1 | 5/2005 | Wiant et al. | | |
| 7,329,813 B2 | 2/2008 | Josten et al. | | |
| 7,334,315 B2 | 2/2008 | Wiant et al. | | |
| 7,449,635 B2 | 11/2008 | Wiant | | |

(Continued)

*Primary Examiner* — Adam B Dravininkas

(57) ABSTRACT

A power distribution assembly includes a first conductor having a first conductor end and a first shape in cross-section and a second conductor having a second conductor end and a second shape in cross-section. A splice couples the first conductor end to the second conductor end. An insulative boot has a first opening of the first shape, wherein the insulative boot encompasses the first conductor end. The insulative boot also has a second opening having the second shape, wherein the second opening encompasses the second conductor end. The insulative boot has a cavity between the first end and the second end, wherein the cavity is configured to encompass the splice.

19 Claims, 9 Drawing Sheets

(56) References Cited

U.S. PATENT DOCUMENTS

| | | | |
|---|---|---|---|
| 7,719,823 B2 | 5/2010 | Josten et al. | |
| 8,437,118 B2 | 5/2013 | Kasza et al. | |
| 8,717,741 B2 | 5/2014 | Valenzuela | |
| 9,144,161 B2 | 9/2015 | Kozuru et al. | |
| 9,197,045 B2* | 11/2015 | Jur | H02G 3/0418 |
| 9,391,413 B2 | 7/2016 | Blasbalg et al. | |
| 9,608,413 B2 | 3/2017 | Kubota et al. | |
| 9,702,485 B2* | 7/2017 | Hiller | F16L 3/02 |
| 9,705,294 B2 | 7/2017 | Kubota et al. | |
| 2006/0040538 A1* | 2/2006 | Wiant | H02B 1/21 |
| | | | 439/213 |
| 2010/0051342 A1 | 3/2010 | Diaz | |
| 2013/0120090 A1* | 5/2013 | Ball | H01H 83/04 |
| | | | 335/1 |

* cited by examiner

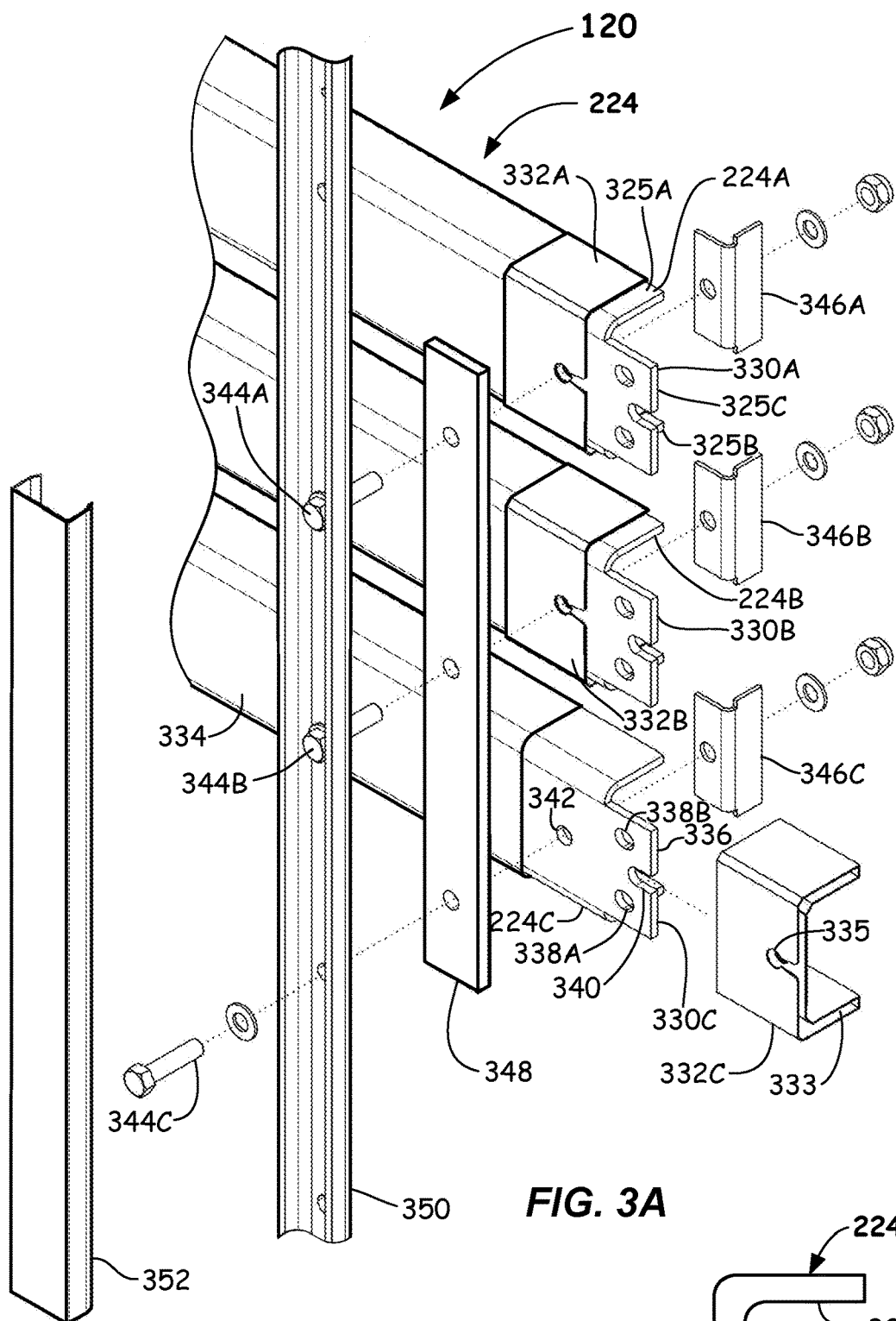
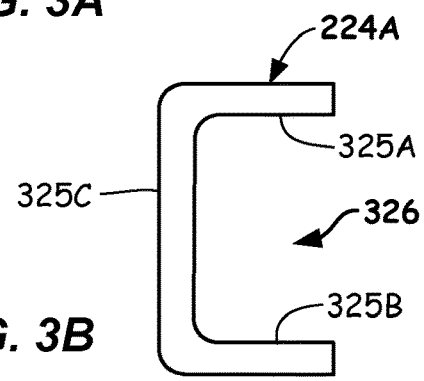
*FIG. 3A*
*FIG. 3B*

INSULATIVE BOOTS AND POWER DISTRIBUTION ASSEMBLIES

FIELD

The present disclosure relates to assemblies, systems, and methods for electrical power distribution, and specifically to power distribution systems having multiple sections.

BACKGROUND

Power distribution systems (e.g., switchgear and switchboard systems) may be fabricated as partial units or sections, referred to as shipping splits. The shipping splits are assembled at the final destinations of the power distributions systems. Electrical conductors between the shipping splits are coupled together during the final assembly at the final destination.

There is a need for improvements to various splicing components coupling conductors of individual shipping splits of power distribution systems.

SUMMARY

According to a first aspect, a power distribution system is provided. The power distribution system includes a first conductor having a first conductor end and a first shape in cross-section and a second conductor having a second conductor end and a second shape in cross-section. A splice couples the first conductor end to the second conductor end. An insulative boot comprises a first portion moveable relative to a second portion, the insulative boot being in a closed state when the first portion abuts the second portion, and the insulative boot being in an open state when the first portion is spaced from the second portion; a first opening at a first end, the first opening having the first shape when the insulative boot is in the closed state, the first opening encompassing the first conductor end when the insulative boot is in the closed state; a second opening at a second end, the second opening having the second shape when the insulative boot is in the closed state, the second opening encompassing the second conductor end when the insulative boot is in the closed state; and a cavity between the first end and the second end, wherein the cavity is configured to encompass the splice when the insulative boot is in the closed state.

According to another aspect, an insulative boot configured to cover a splice between a first conductor and a second conductor is provided. The insulative boot includes a first portion including a first tab; one or more first holes extending through the first tab; a second portion including a second tab, the second portion being moveable relative to the first portion, the insulative boot being in a closed state when the first tab abuts the second tab and the insulative boot being in an open state when the first tab is spaced from the second tab; one or more second holes extending through the second tab, the one or more second holes aligning with the one or more first holes when the insulative boot is in the closed state; a first end; a first opening located at the first end and having a periphery of a shape of the first conductor in cross-section when the insulative boot is in the closed state, the shape of the first conductor in cross-section including a first concave region; a first flange extending into the first concave region; and a lip extending from the first flange.

In another aspect, an insulative boot configured to cover a splice between a first conductor and a second conductor is provided. The insulative boot includes a first portion including a first tab; one or more first holes extending through the first tab; a second portion including a second tab, the second portion being moveable relative to the first portion, the insulative boot being in a closed state when the first tab abuts the second tab and the insulative boot being in an open state when the first tab is spaced from the second tab; one or more second holes extending through the second tab, the one or more second holes aligning with the one or more first holes when the insulative boot is in the closed state; a first end; a first opening located at the first end and having a periphery of a shape of the first conductor in cross-section when the insulative boot is in the closed state; one or more extensions extending from the first opening; and one or more gaps between the one or more extensions.

Still other aspects, features, and advantages of the present disclosure may be readily apparent from the following description by illustrating a number of example embodiments, including the best mode contemplated for carrying out the present disclosure. The present disclosure may also be capable of other and different embodiments, and its details may be modified in various respects, all without departing from the substance and scope of the present disclosure. The disclosure covers all modifications, equivalents, and alternatives falling within the substance and scope of the claims.

BRIEF DESCRIPTION OF DRAWINGS

The drawings, described below, are for illustrative purposes only and are not necessarily drawn to scale. The drawings are not intended to limit the scope of the disclosure in any way. Wherever possible, the same or like reference numbers will be used throughout the drawings to refer to the same or like parts.

FIG. 3A illustrates a front isometric view of a bus including single channel conductors within a first shipping split of a power distribution system according to embodiments.

FIG. 3B illustrates a cross-sectional view of a channel of a single channel bus according to embodiments.

DETAILED DESCRIPTION

Reference will now be made in detail to the example embodiments of this disclosure, which are illustrated in the accompanying drawings. Power distribution systems, including switchgears and switchboards, may distribute electric power to a plurality of different systems, locations, and devices. For example, an input of a power distribution system may be connected to a main power line, such as the main power line to a building. The power distribution systems may include circuits and the like that distribute power to a plurality of locations, such as different floors or areas in a building or to different pieces of heavy equipment. Current flow through power distribution systems may be several hundred amperes to 150 kA or greater. In some embodiments, the power distribution systems may monitor current flow to the different locations and may include circuit breakers to disconnect power to locations that draw current in excess of a predetermined amperage.

Power distribution systems may be fabricated in panelized structures that may include a plurality of cabinets or cabinet sections. The front of the panel structures may include user controls, such as circuit breakers, and monitoring devices. In order to conserve space in facilities, the interior of the power distribution systems may be densely packed with controls, buses, circuit breakers, and other components. Cables and associated terminal assemblies that distribute power to different locations may be accessible to users from behind the front portions of panel structures. Thus, locations of power distribution systems can be such that they enable user access solely through the front of the panel structures. Some embodiments of power distribution systems may include both front and rear access.

The power distribution systems may be fabricated in sections or splits (e.g., shipping splits). Two or more shipping splits may be manufactured at an assembly plant and shipped to a final destination. The shipping splits may then be coupled together at the final destination to form a line-up, which constitutes a power distribution system. Conductors in the individual shipping splits are spliced together when the individual shipping splits are located side-by-side. The conductors and the splices may be insulated within the shipping splits. The splice locations may be within tight confines of the shipping splits, which can make insulating the splices difficult.

Power distribution systems and insulators for covering splices are disclosed herein in FIGS. 1-8. The configurations of power distribution systems disclosed herein enable users to insulate splices within tight confines of power distribution systems.

Figure 1:
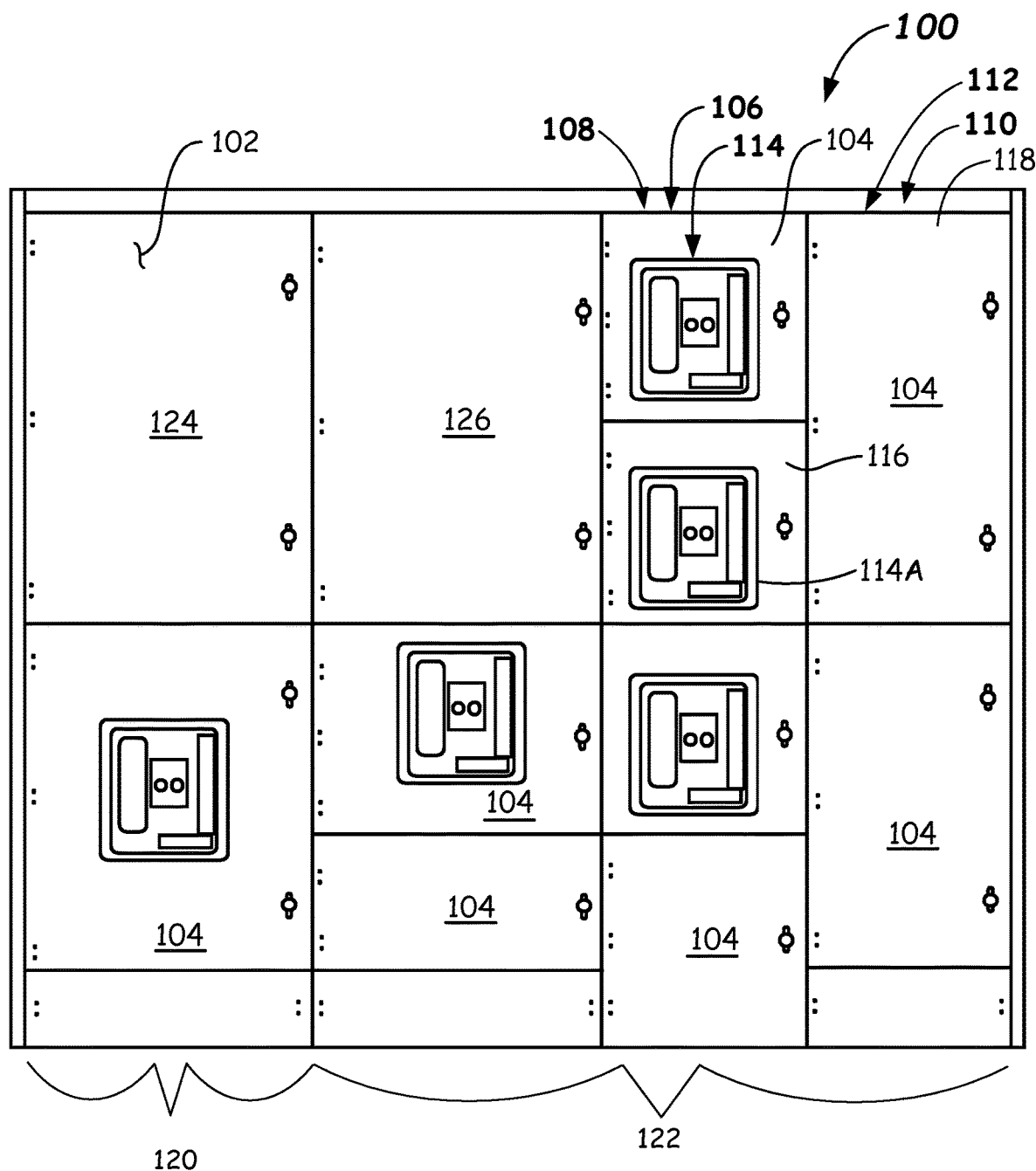
FIG. 1 illustrates a front elevation view of an exterior of a power distribution system (e.g., a switchgear or a switchboard) according to one or more embodiments.

Reference is now made to FIG. 1, which illustrates a front view of an embodiment of an assembled power distribution system 100. The power distribution system 100 may be a switchgear or a switchboard. The power distribution system 100 may include a front surface 102 including a plurality of panels 104 (a few labeled).

A first plurality of panels 106 may include user interfaces 114, which may include controls, such as circuit breakers and other controllers to control and monitor power distribution to different locations. The components within the first plurality of panels 106 may be collectively referred to as the circuit breaker section 108 and may electrically couple to the user interfaces 114. In the embodiment depicted in FIG. 1, the first plurality of panels 106 of the circuit breaker section 108 may be vertically aligned.

A second plurality of panels 110 may contain terminal assemblies, bus assemblies, cables, and the like that electrically connect the power distribution system 100 to locations where power is distributed, such as locations in a building and power equipment. The second plurality of panels 110 may also contain buses carrying line power. These panels are collectively referred to as the cable pull section 112. In the embodiment depicted in FIG. 1, the second plurality of panels 110 of the cable pull section 112 may be vertically aligned. The circuit breaker section 108 may be adjacent or abut the cable pull section 112.

Reference is now made to a panel 116 in the circuit breaker section 108 and a panel 118 in the cable pull section 112, which may be representative of other panels in their respective sections or in the power distribution system 100. The panel 118 may be capable of being opened or removed to enable a user access within the cable pull section 112. Terminal assemblies (not shown in FIG. 1) located behind the panel 118 may be electrically connected to cables that provide power to locations and devices as described above. Thus, a user may access the terminal assemblies from the front of the power distribution system 100. The panel 116 may include a user interface 114A, that may include components such as controls, switches, and circuit breakers, and the like that control and monitor the power distributed via the terminal assemblies located behind the panel 118.

The power distribution system 100 may be fabricated at a manufacturing facility as a first shipping split 120 and a second shipping split 122. Other embodiments of the power distribution system 100 may include more than two shipping splits. The first shipping split 120 and the second shipping split 122 may be coupled together at the final destination of the power distribution system 100. A panel 124 and a panel 126 may be opened so that a user may access buses and conductors located between the first shipping split 120 and the second shipping split 122.

Figure 2:
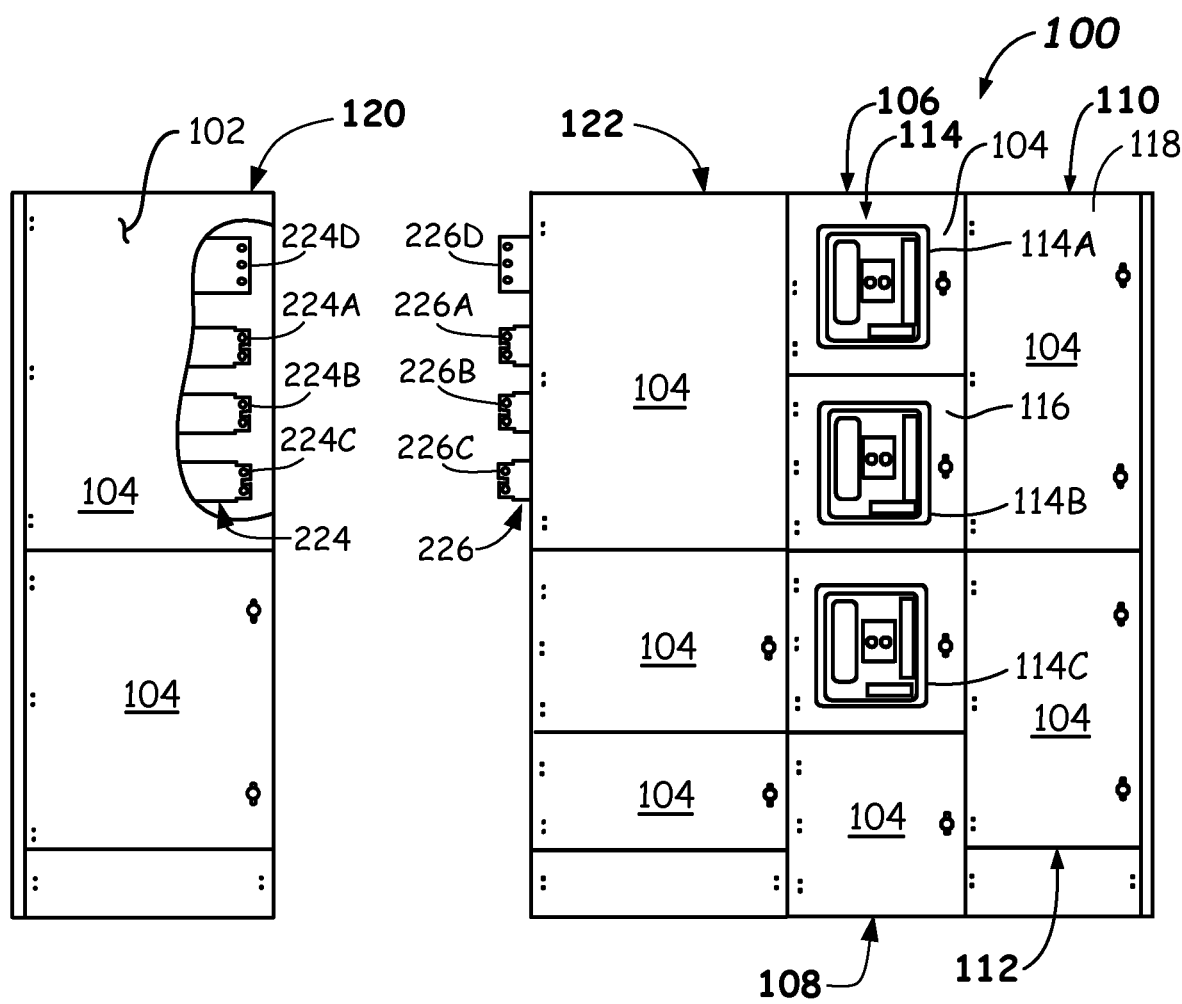
FIG. 2 illustrates a front elevation view of a power distribution system separated into two shipping splits with a portion of a first shipping split cutout to show conductors located therein according to embodiments.

Additional reference is made to FIG. 2, which illustrates the first shipping split 120 separated from the second shipping split 122. Both the first shipping split 120 and the second shipping split 122 may include conductors, such as conductors in a bus that splice together when the first shipping split 120 and the second shipping split 122 are connected together as shown in FIG. 1. In the embodiment shown in FIG. 2, the first shipping split 120 may include a first bus 224 including four conductors 224A-224D. The second shipping split 122 may include a second bus 226 including four conductors 226A-226D. The conductors described herein may be single channel conductors and/or dual channel conductors. As described in greater detail below, single channel conductors may include a single conductor and dual channel conductors may include two channels that may be located side-by-side. The conductor 224D and the conductor 226D may be neutral lines.

Reference is now made to FIG. 3A, which illustrates a front isometric view of an embodiment of the first bus 224 within the first shipping split 120. The first bus 224 may include three conductors 224A-224C, which may be three single channel conductors. The conductor 224D (FIG. 2) may be a neutral and may not include the insulating materials applied to the conductors 224A-224C. Each of the conductors 224A-224C may have an end 330A-330C that mechanically and electrically connect with ends of the conductors 226A-226C (FIG. 2) in the second bus 226 of the second shipping split 122. The conductors 224A-224C may have insulative sleeves 332A-332C located proximate the ends 330A-330C as described herein. The conductors 224A and 224B are illustrated with insulative sleeves 332A and 332B in place. The conductor 224C is illustrated with an insulative sleeve 332C removed from the end 330C for illustration purposes. Some embodiments may not include the insulative sleeves 332A-332C.

Additional reference is made to FIG. 3B, which illustrates the conductor 224A in cross-section. The cross-sectional shape of the conductor 224A may be representative of all the conductors 224A-224C and the conductors 226A-226C (FIG. 2). The conductors 224A-224C may be C-shaped in cross-section or substantially C-shaped in cross-section or otherwise include a first member 325A (e.g., a horizontal member) and a second member 325B (e.g., a horizontal member) joined by a connecting member 325C (e.g., a vertical member). The horizontal and vertical orientations are for reference purposes only and are not meant to limit the scope of the disclosure. The first member 325A and the second member 325B may be parallel to each other. Both the first member 325A and the second member 325B may be attached to and extend from ends of the connecting member 325C. The connecting member 325C may be perpendicular to both the first member 325A and the second member 325B. A concave region 326 may be formed by the first member 325A, the second member 325B, and the connecting member 325C. The conductors 224A-224C may have other cross-sectional shapes.

The conductor 224C will now be described in detail. The other conductors 224A-224B and the conductors 226A-226C (FIG. 2) may be identical or substantially similar to the conductor 224C. All but a portion of the conductor 224C may be covered with an insulative material 334. The insulative material 334 prevents current flow from one side of the insulative material 334 to another side of the insulative material 334 when a voltage potential present on the conductor 224C is applied across the insulative material 334. When the insulative sleeve 332C is applied to (e.g. slid onto) the end 330C of the conductor 224C, the insulative sleeve 332C may abut or overlap the insulative material 334.

The end 330C of the conductor 224C may have a tab 336 extending therefrom. The tab 336 may accommodate a plate (not shown in FIG. 3A) that joins (e.g., splices) the tab 336 with a similar tab on the conductor 226C (FIG. 2). The tab 336 may include through holes 338A and 338B that receive fasteners (e.g., bolts) that fasten the aforementioned plate to the tab 336. The end of the tab 336 may include a notch 340 or the like that serves to align the tab 336 with other components. The end 330C may include a conductor hole 342 that may receive a bolt 344C or the like to secure the conductor 224C within the first shipping split 120.

The insulative sleeves 332A-332C may be configured to slide over respective ends 330A-330C of the conductors 224A-224C. The insulative sleeves 332A-332C may be made of a continuous sheet of flexible material that forms holes 333 extending through the insulative sleeves 332A-332C. The insulative sleeves 332A-332C may be able to be slid over the ends 330A-330C of the conductors 224A-224C similar to collars to provide insulation between the ends 330A-330C and the insulating material 334. For example, the ends 330A-330C may fit into the holes 333 in the insulative sleeves 332A-332C, so that the insulative sleeves 332A-332C may slide onto the ends 330A-330C of the conductors 224A-224C. In some embodiments, the insulative sleeves 332A-332C have the same cross-sectional shape as the conductors 224A-224C and the insulative sleeves 332A-332C may fit on the conductors 224A-224C a distance further than the ends 330A-330C.

Brace 348 (e.g., a vertical brace) may extend vertically within the first shipping split 120 and may brace the conductors 224A-224C in fixed positions relative to each other within the first shipping split 120. A similar brace may be located in the second shipping split 122. The brace 348 may be made of an insulative material. A support 350 (e.g., a vertical support) may extend vertically within the first shipping split 120 and may support the conductors 224A-224C in fixed positions within the first shipping split 120. For example, the bolts 344A-344C may extend through support holes (not shown) in the support 350, through holes in the brace 348, through sleeve holes 335 in the insulative sleeves 332A-332C and through the conductor holes 342 in the conductors 224A-224C. In some embodiments, elbow brackets 346A-346C may be located against the insulative sleeves 332A-332C and may prevent the insulative sleeves 332A-332C from bending or deforming. The elbow brackets 346A-346C may be held in place by the bolts 344A-344C. The support 350 may be attached to frame members (not shown) or other rigid members within the first shipping split 120. An insulative cover 352 may cover the support 350 and the bolts 344A-344C. For example, the insulative cover 352 may snap onto the support 350.

The second shipping split 122 (FIGS. 1 and 2) may include the insulators and support structures on the conductors 226A-226C that are identical or substantially similar to those described above with reference to the conductors 224A-224C.

Figure 4A:
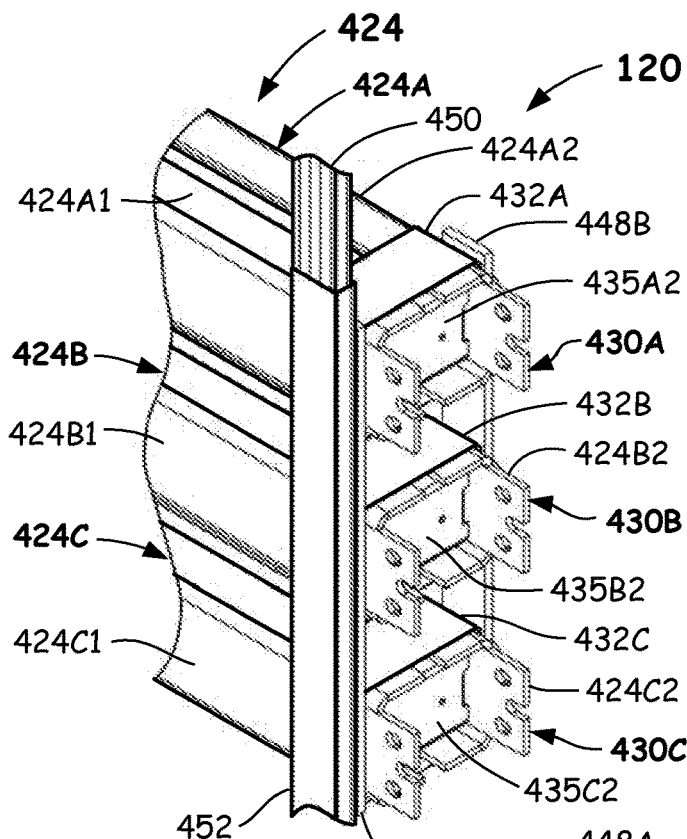
FIG. 4A illustrates a front isometric view of a bus including dual channel conductors with insulative sleeves applied thereto according to embodiments.
Figure 4C:
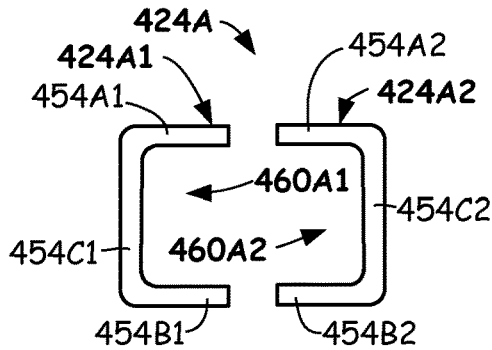
FIG. 4C illustrates a cross-sectional view of conductors of a dual channel bus according to embodiments.
Figure 4B:
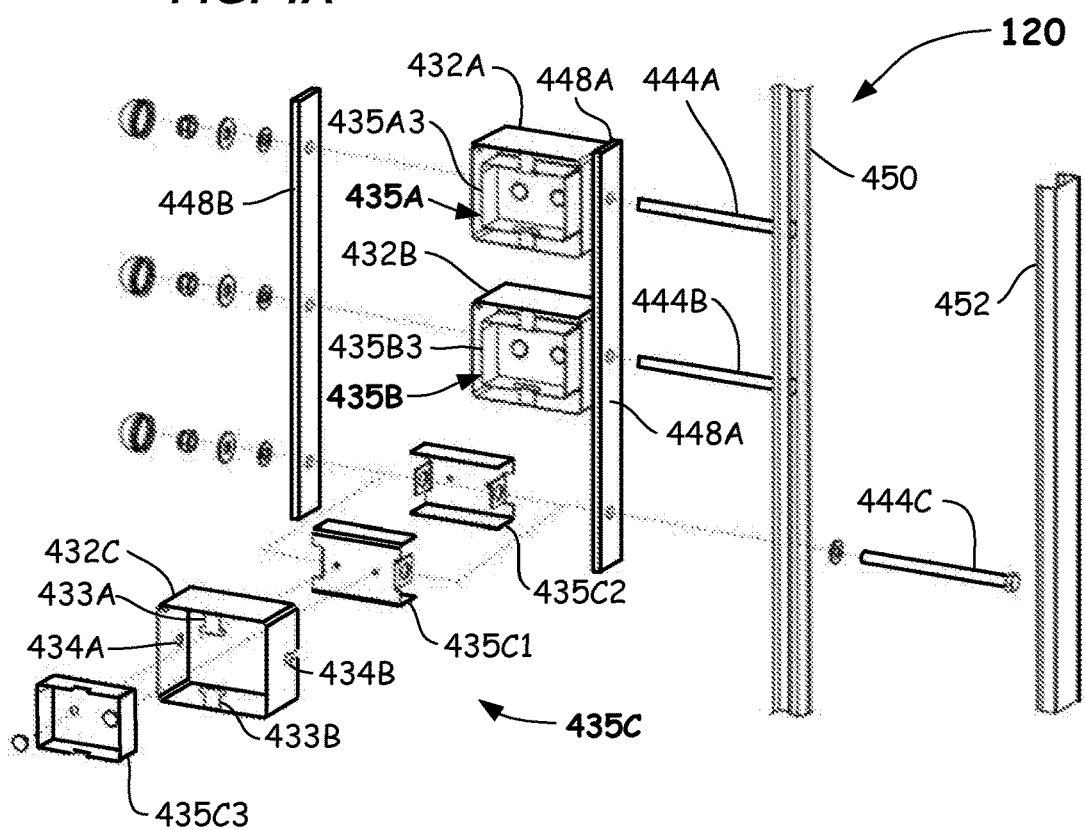
FIG. 4B illustrates an exploded view of the insulative sleeves of FIG. 4A according to embodiments.

Reference is now made to FIGS. 4A and 4B, which illustrate a bus 424 comprising dual channel conductors 424A-424C within the first shipping split 120. The dual channel conductors 424A-424C may be used in place of the conductors 224A-224C (FIG. 2) and the conductors 226A-226C in the first shipping split 120 and the second shipping split 122. FIG. 4A illustrates ends of the dual channel conductors 424A-424C with insulators assembled thereon. FIG. 4B illustrates an exploded view of insulators and spacers applied to the ends of the dual channel conductors 424A-424C. The dual channel conductors 424A-424C include two channels for each phase versus a single channel for each phase as with single channel conductors. A conductor 424A may include a first channel 424A1 and a second channel 424A2. A conductor 424B may include a first channel 424B1 and a second channel 424B2. A conductor 424C may include a first channel 424C1 and a second channel 424C2. The individual channels may have the same or similar cross-sectional shape as the conductors 224A-224C (FIG. 3A).

The conductors 424A-424C may each have an end 430A-430C. Each end 430A-430C may include the ends of two channels such that the cross-sectional shape of the ends 430A-430C may be somewhat square or rectangular with rounded corners. Additional reference is made to FIG. 4C, which illustrates a cross-sectional view of the conductor 424A, which may be identical or substantially similar to the cross-sectional shapes of the other conductors 424B and 424C. The conductor 424A may include the first channel 424A1 and the second channel 424A2. Both the first channel 424A1 and the second channel 424A2 may have the same or substantially similar cross-sectional shapes as the conductor 224C (FIG. 3B). The first channel 424A1 may include a first horizontal member 454A1 and a second horizontal member 454B1 joined by a vertical member 454C1. The second channel 424A2 may include a first horizontal member 454A2 and a second horizontal member 454B2 joined by a vertical member 454C2. The horizontal and vertical orientations are for illustration purposes only and are not meant to limit the scope of the disclosure. The first channel 424A1 may include a first concave region 460A1 and the second channel 424A2 may include a second concave region 460A2. The conductors 424A-424C may have other cross-sectional shapes.

Insulative sleeves 432A-432C may fit over each of the respective ends 430A-430C of the conductors 424A-424C. The insulative sleeves 432A-432C may have the same or substantially the same cross-sectional shape as the cross-sectional shape or exterior perimeter of the conductors 424A-424C as shown by the dual channel conductor 424A in FIG. 4C. Referring to the insulative sleeve 432C of FIG. 4B, tabs 433A and 433B may extend inward and may be configured to be located in spaces between the first channel 424C1 and the second channel 424C2 of the conductor 424C. The insulative sleeves 432A-432C may have sleeve holes 434A and 434B that are configured to receive fasteners 444A-444C (e.g., bolts). At least some of the sleeve holes 434B may be slots.

Each of the conductors 424A-424C may include a spacer 435A-435C located therein. The conductor 424C includes a spacer 435C that may be typical of the spacers 435A and 435B located in the other conductors 424A and 424B. The spacer 435C may include a first piece 435C1, a second piece 435C2, and a cup 435C3. Cups 435A3 and 435B3 of the spacers 435A and 435B, respectively, are shown in FIG. 4B. The first piece 435C1 and the second piece 435C2 may be similarly shaped and each may include holes. The holes in all the pieces in all the spacers 435A-435C may be configured to receive fasteners 444A-444C. The cup 435C3 may attach to the first piece 435C1. The second pieces 435A2-435C2 are shown in FIG. 4A. A first brace 448A and a second brace 448B may be located on the sides of the insulative sleeves 432A-432C and may include holes to receive the fasteners 444A-444C. A support 450 may receive the fasteners 444A-444C and may secure the above-described components within the first shipping split 120. An insulative cover 452 may cover the support 450 and the bolts 444A-C.

Figure 5A:
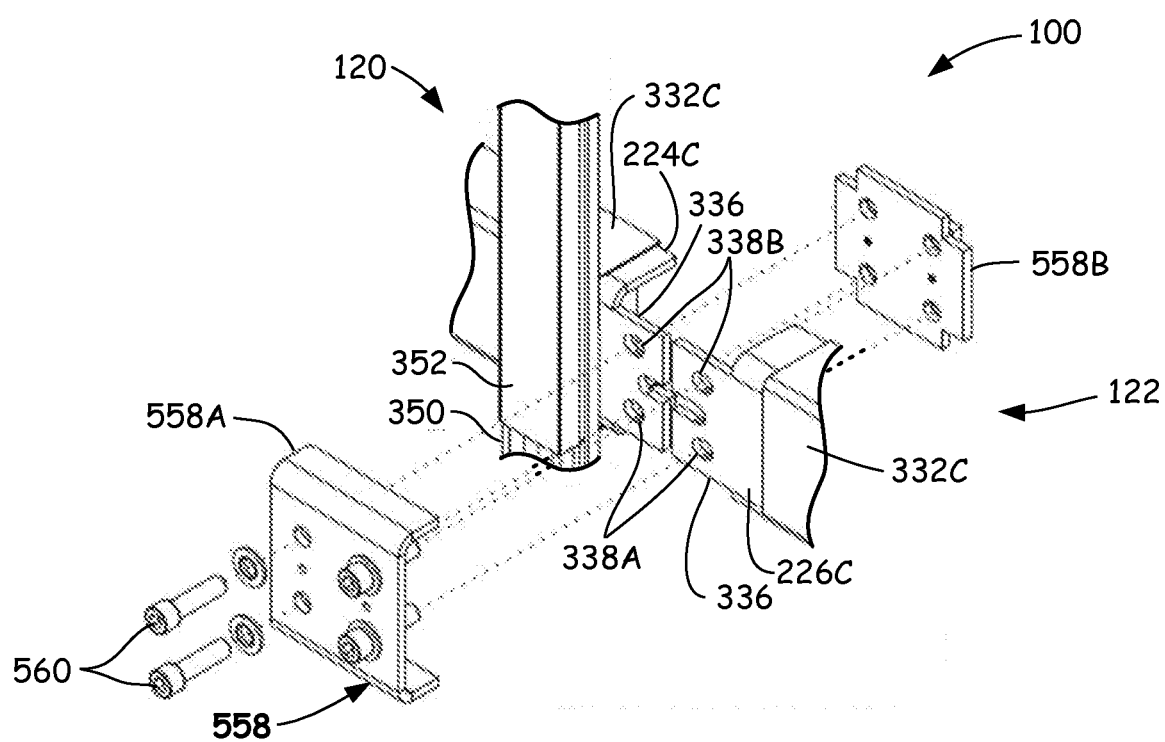
FIG. 5A illustrates a front isometric view of two single channel conductors having a splice applied to the conductors according to embodiments.

Reference is now made to FIG. 5A, which illustrates a partial splice between a conductor 224C in the first shipping split 120 and a conductor 226C in the second shipping split 122. A first portion 558A of a splice plate 558 may be attached to a first side of the conductors 224C and 226C. A second portion 558B of the splice plate 558 may be attached to an opposite side of the conductors 224C and 226C. The splice plate 558 electrically and mechanically couples the conductor 224C to the conductor 226C. Fasteners 560 (e.g., bolts) may extend through holes in the first portion 558A and the second portion 558B and the holes 338A and 338B in the conductors 224A and 224C to sandwich the ends 330C of the conductors 224C and 226C between the first portion 558A and the second portion 558B. The completed splice 562 is shown in FIG. 5B.

Figure 5B:
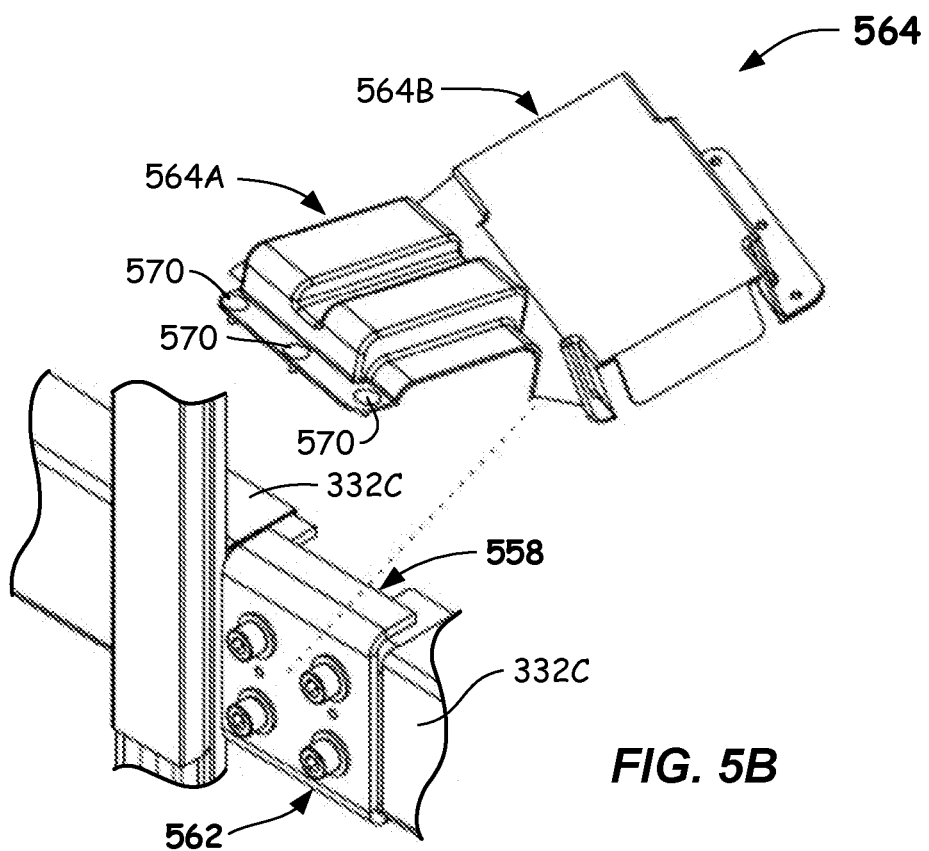
FIG. 5B illustrates a front isometric view of two single channel conductors spliced together and an insulative boot in an open state being applied to the splice according to embodiments.
Figure 5C:
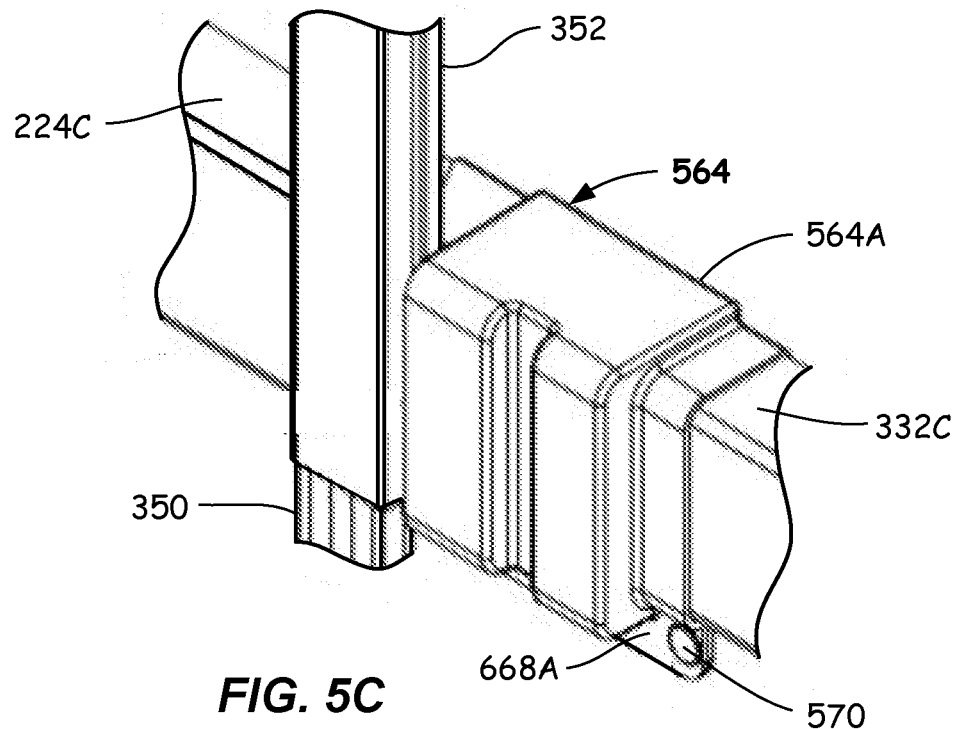
FIG. 5C illustrates a front isometric view of an insulative boot positioned over a splice of two single channel conductors according to embodiments.
Figure 5D:
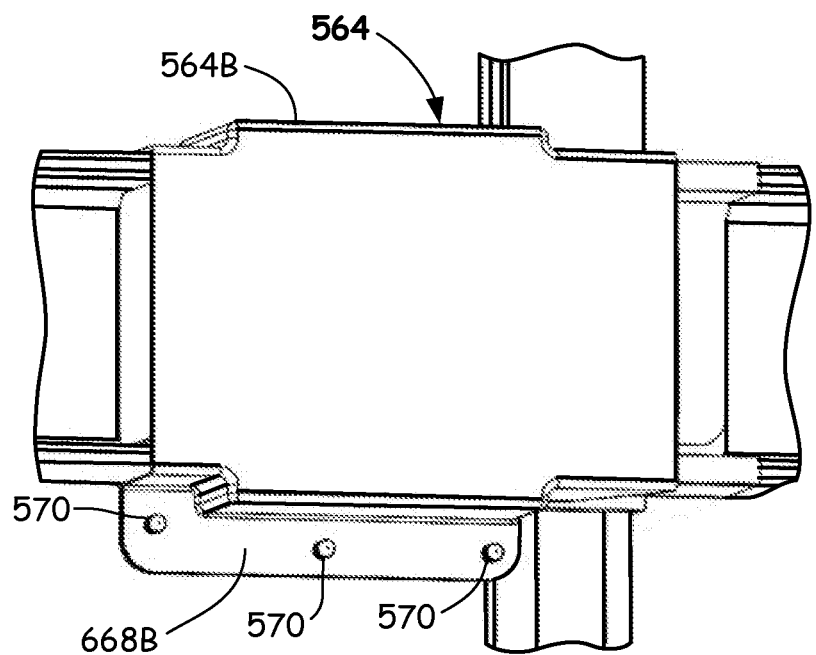
FIG. 5D illustrates a rear isometric view of an insulative boot positioned over a splice of two single channel conductors according to embodiments.

Referring to FIG. 5B, an insulative boot 564 may be placed over the splice 562. The insulative boot 564 illustrated in FIG. 5B is configured to be placed over the splice 562 of a single channel conductor. An insulative boot configured to be placed over a dual channel conductor is described further below. The insulative boot 564 insulates the region of the splice 562 and may abut or overlap the insulative sleeves 332C. The insulative boot 564 may include a first portion 564A and a second portion 564B. In some embodiments, the insulative boot 564 is made of a flexible material, such as a rubber or plastic (e.g., PVC) that enables the first portion 564A to be moveable or flexible relative to the second portion 564B. Reference is made to FIG. 5C, which illustrates a front isometric view of the insulative boot 564 positioned over the splice 562 (not shown in FIG. 5C). Additional reference is made to FIG. 5D, which illustrates a rear isometric view of the insulative boot 564 positioned over the splice 562 (not shown in FIG. 5D).

The insulative boot 564 may have an open state wherein the first portion 564A and the second portion 564B are spaced apart as shown in FIG. 5B. The insulative boot 564 may have a closed state wherein the first portion 564A and the second portion 564B abut each other or are proximate each other as shown in FIGS. 5C, 5D, 6A, and 6B.

Figure 6A:
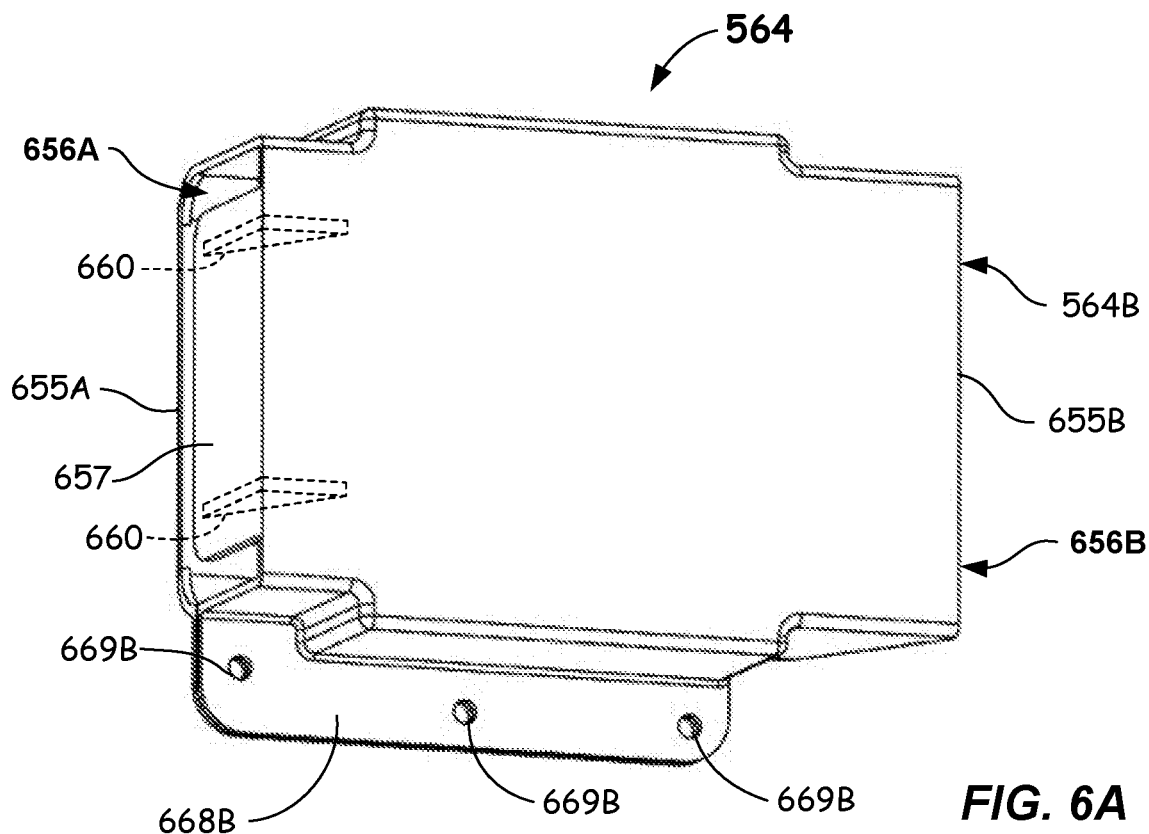
FIG. 6A illustrates a rear isometric view of an insulative boot configured to cover a splice of a single channel conductor according to embodiments.
Figure 6B:
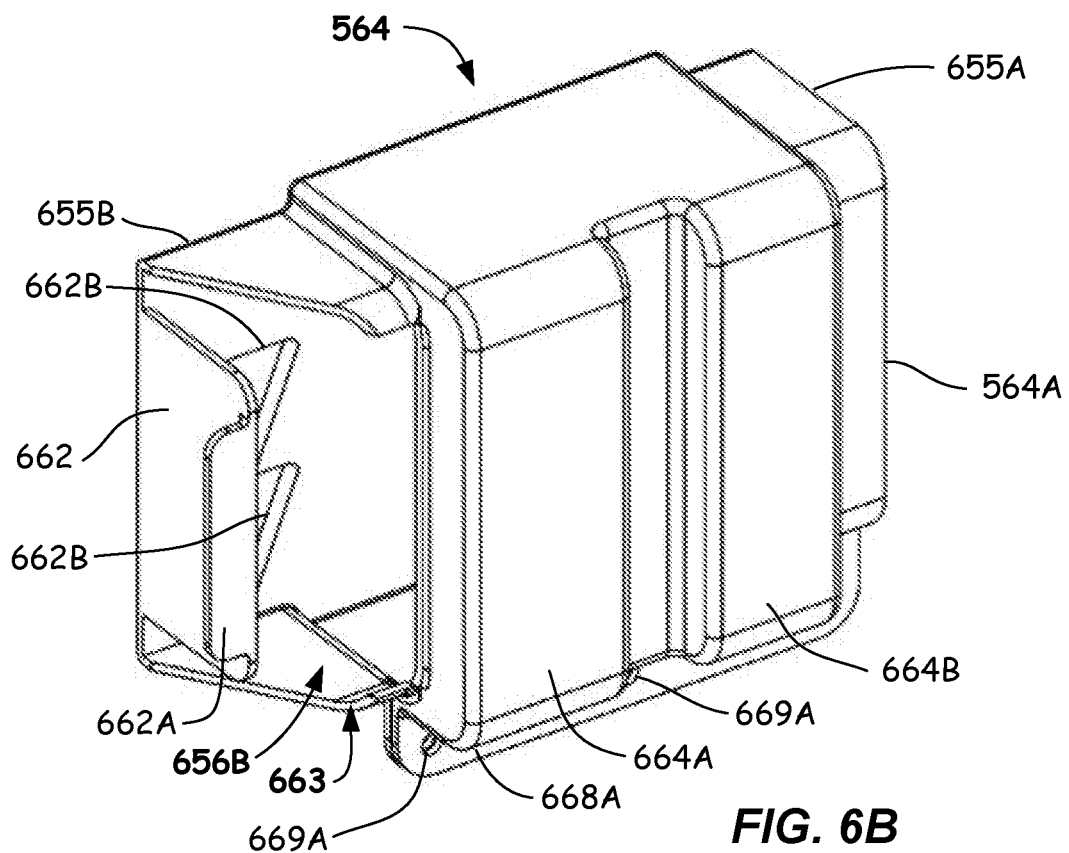
FIG. 6B illustrates a front isometric view of an insulative boot configured to cover a splice of a single channel conductor according to embodiments.

Reference is now made to FIG. 6A, which illustrates a rear isometric view of the insulative boot 564. Reference is also made to FIG. 6B, which illustrates a front isometric view of the insulative boot 564. The insulative boot 564 may include a first end 655A and an opposite second end 655B. A cavity sized to accommodate a splice may be located between the first end 655A and the second end 655B. The insulative boot 564 may include a first opening 656A located at the first end 655A and a second opening 656B located at the second end 655B. The first opening 656A and the second opening 656B may have cross-sectional shapes that are identical or substantially similar to the cross-sectional shape of the conductors 224A-224C, as shown in FIG. 3B, to which the insulative boot 564 is applied. For example, the first opening 656A and the second opening 656B may both have the cross-sectional shapes shown in FIG. 3B. Thus, the insulative boot 564 may fit snug over the conductor 224C when the insulative boot 564 is in the closed state. In some embodiments, the openings 656A, 656B fit over the insulative sleeves 332A-332C (FIG. 3A).

The first portion 564A of the insulative boot 564 may include a first tab 668A and the second portion 564B of the insulative boot 564 may include a second tab 668B. The first tab 668A may include holes 669A and the second tab 668B may include holes 669B. When the insulative boot 564 is in the closed state, the first tab 668A may abut the second tab 668B and the holes 669A may align with the holes 669B. Fasteners 570 (FIGS. 5B-5D) may be received in the holes 669A, 669B when the insulative boot 564 is in the closed state to maintain the insulative boot 564 in the closed state. The fasteners 570 may be removable to enable a user access to the splice 562 (FIG. 5B). The insulative boot 564 may be in the open state when the first tab 668A and the second tab 668B are spaced apart.

The first end 655A of the insulative boot 564 may include a flange 657 at least partially defining the shape of the first opening 656A. The flange 657 may have the same or substantially similar shape as the concave region 326 (FIG. 3B) of the conductors 224A-224C. The flange 657 may fit within the concave region 326 of the conductors 224A-224C when the insulative boot 564 is in the closed state. Thus, the flange 657 may make the concave regions 326 of the conductors 224A-224C inaccessible to physical contact when the insulative boot 564 is applied to the conductors 224A-224C. The insulative boot 564 may include gussets 660 or other stiffening devices that maintain the flange 657 in a predetermined position. For example, the gussets 660 may prevent the flange 657 from moving out of the concave region 326 (FIG. 3B) when the insulative boot 564 is in the closed state and encompassing a conductor.

The second end 655B may include a flange 662 having a shape that is the same or substantially similar to the concave region 326 (FIG. 3B) of the conductors 224A-224C. The flange 662 may include a lip 662A and/or gussets 662B that stiffen the flange 662 to maintain it in the concave region 326 (FIG. 3B). The second end 655B may include a gap 663 adjacent the flange 662. The gap 663 may receive the brace 348 (FIG. 3A) and/or the support 350 when the insulative boot 564 is placed on a conductor. The first portion 564A may include a first extended region 664A and a second extended region 664B that accommodate the fasteners 560 (FIG. 5A) attaching the first portion 558A and the second portion 558B of the splice plate 558 together.

Figure 7A:
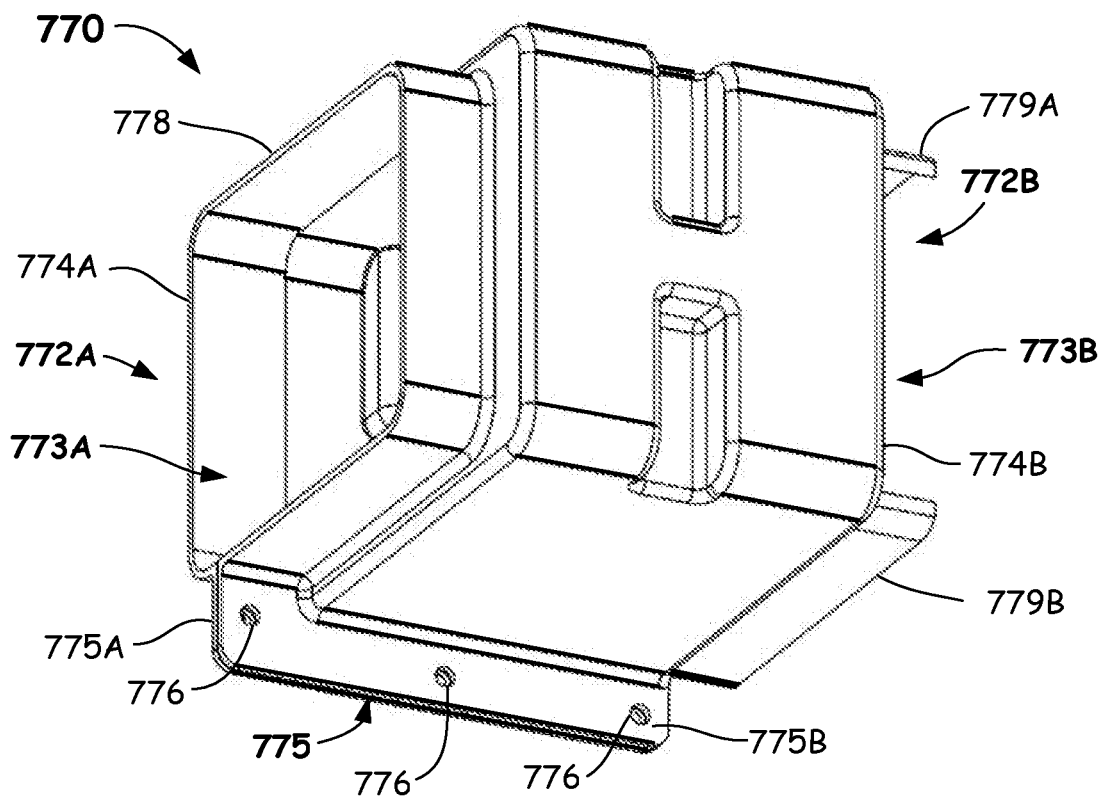
FIG. 7A illustrates a rear isometric view of an insulative boot configured to cover a splice of a dual channel conductor according to embodiments.
Figure 7B:
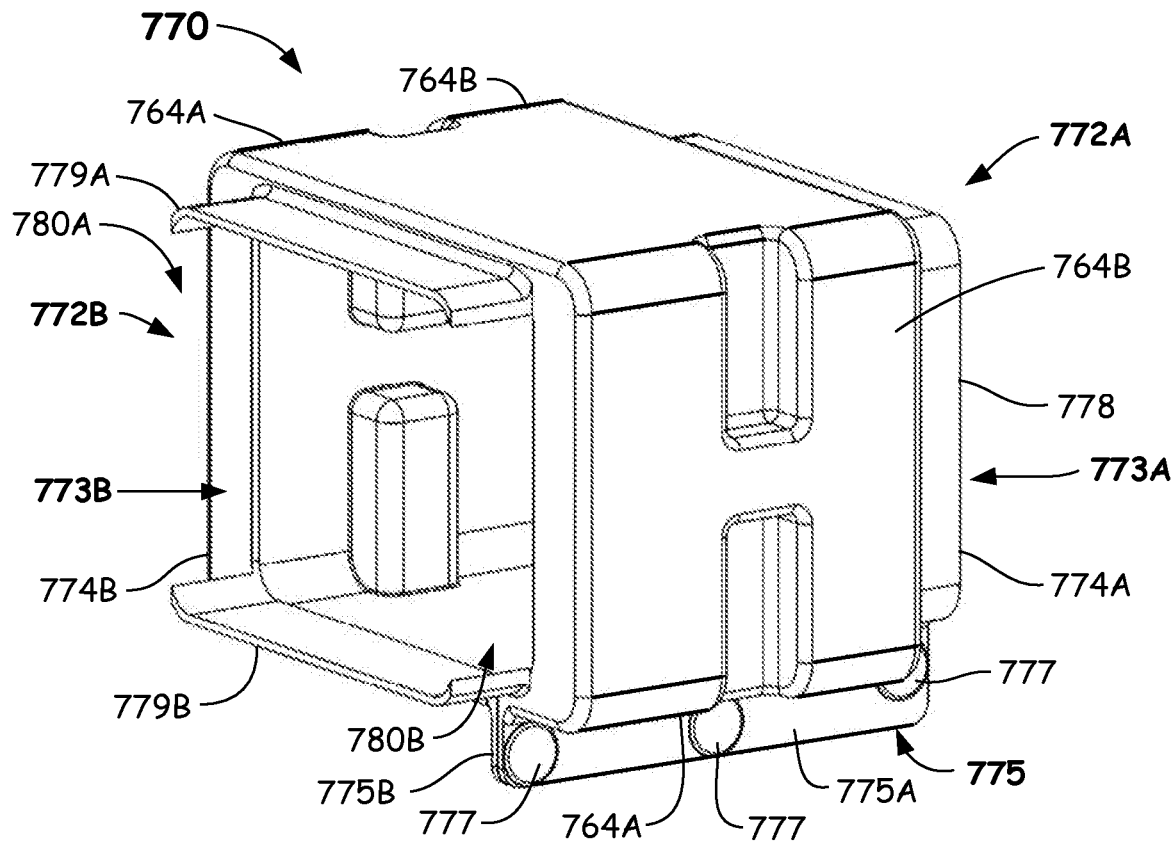
FIG. 7B illustrates a front isometric view of the insulative boot of FIG. 7A according to embodiments.

Reference is now made to FIG. 7A, which illustrates a rear isometric view of an insulative boot 770 that may cover a splice in a dual channel bus, such as at an end of the conductor 424A (FIGS. 4A and 4C). Reference is also made to FIG. 7B, which illustrates a front isometric view of the insulative boot 770. The insulative boot 770 may include a first end 772A and an opposite second end 772B. A cavity sized to accommodate a splice may be located between the first end 772A and the second end 772B. The insulative boot 770 may include a first opening 773A located at the first end 772A and a second opening 773B located at the second end 772B. The first opening 773A and the second opening 773B may have shapes that are identical or substantially similar to the cross-sectional shape of the conductors 424A-424C, as shown in FIG. 4C, in the bus 424 to which the insulative boot 770 is applied. Thus, the insulative boot 770 may fit snug over the conductors 424A-424C when it is in a closed state. In some embodiments, the openings 773A, 773B fit over the insulative sleeves 432A-432C (FIG. 4B).

The insulative boot 770 may be defined as including a first portion 774A and a second portion 774B. In some embodiments, the insulative boot 770 may be made of a flexible material, such as rubber, that enables the first portion 774A and the second portion 774B to separate so as to fit over one of the conductors 424A-424C. The insulative boot 770 may include a first tab 775A and a second tab 775B that secure the insulative boot 770 around one of the conductors 424A-424C and the splice located therein. The first tab 775A may be attached to the first portion 774A of the insulative boot 770 and the second tab 775B may be attached to the second portion 774B of the insulative boot 770. The tabs 775A, 775B may include holes 776 (FIG. 7A) that align between the first tab 775A and the second tab 775B. The holes 776 may be configured to receive fasteners 777, such as rivets or screws that secure the first tab 775A and the second tab 775B together. The insulative boot 770 may be in the closed state when the first tab 775A abuts the second tab 775B. The insulative boot 770 may be in the open state when the first tab 775A and the second tab 775B are spaced apart.

The first end 772A may include an extension 778 that may contact the insulative sleeves 432A-432C (FIG. 4B) or the conductors 424A-424C. The second end 772B may include a first extension 779A and a second extension 779B that may contact the insulative sleeves 432A-432B. Gaps 780A and 780B may be located between the first extension 779A and the second extension 779B. The gaps 780A, 780B may receive the braces 448A, 448B and/or the support 450 (FIG. 4B) when the insulative boot 770 is in a closed state around one of the conductors 424A-424C.

The insulative boot 770 may include first extended portions 764A and second extended portions 764B. The extended portions 764A, 764B may accommodate fasteners in a splice plate that mechanically and electrically couples conductors 424A-424C (FIG. 4A) to similar conductors.

Figure 8A:
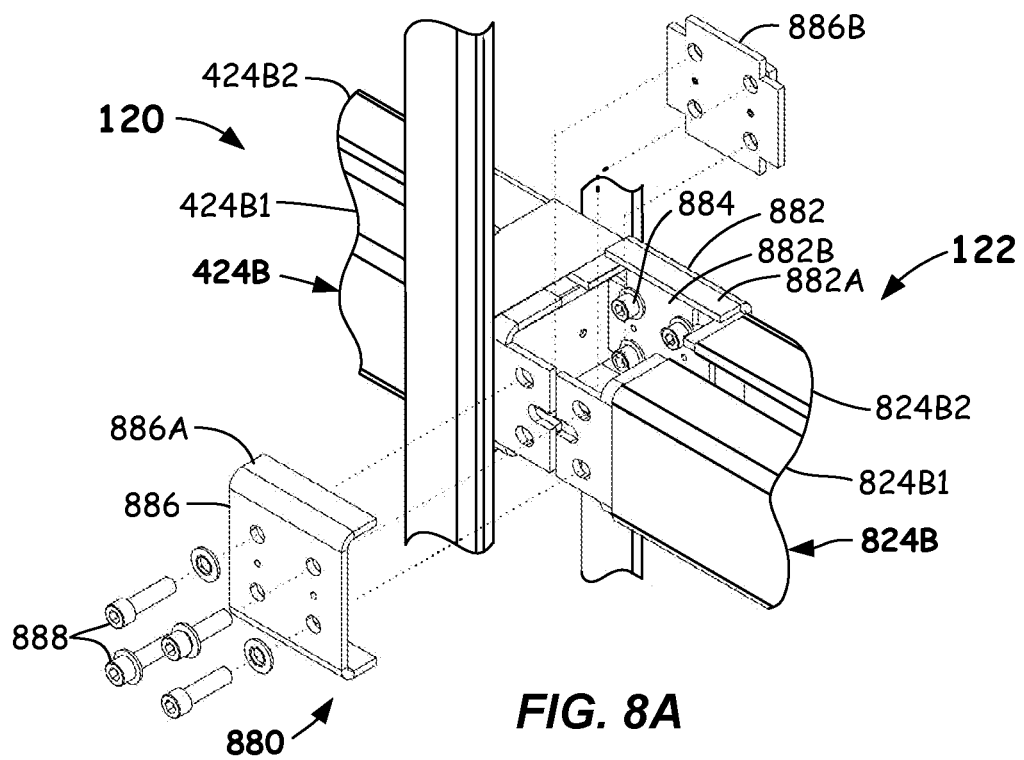
FIG. 8A illustrates an isometric view of a splice being applied between a dual channel conductor in a first shipping split and a dual channel conductor in a second shipping split according to embodiments.

Reference is now made to FIG. 8A, which illustrates an isometric view of a splice 880 being applied between a dual channel conductor 424B in the first shipping split 120 and a dual channel conductor 824B in the second shipping split 122. A first splice 882 may be applied between the second channel 424B2 and a second channel 824B2 in the second shipping split 122. The first splice may include a first plate 882A and a second plate 882B that sandwich the second channel 424B2 and the second channel 824B2. The first plate 882A may have a contour similar to the exterior contour of the dual channel conductors 424B and 824B. The second plate 882B may fit within the concave region 460A2 (FIG. 4C). Fasteners 884 may secure the first plate 882A and the second plate 882B together. A second splice 886 is shown being applied to the first channel 424B1 and a first channel 824B1 in the second shipping split 122. The second splice 886 may include a first plate 886A and a second plate 886B that are identical or substantially similar to the first plate 882A and the second plate 882B. Fasteners 888 may secure the first plate 886A and the second plate 886B together.

Figure 8B:
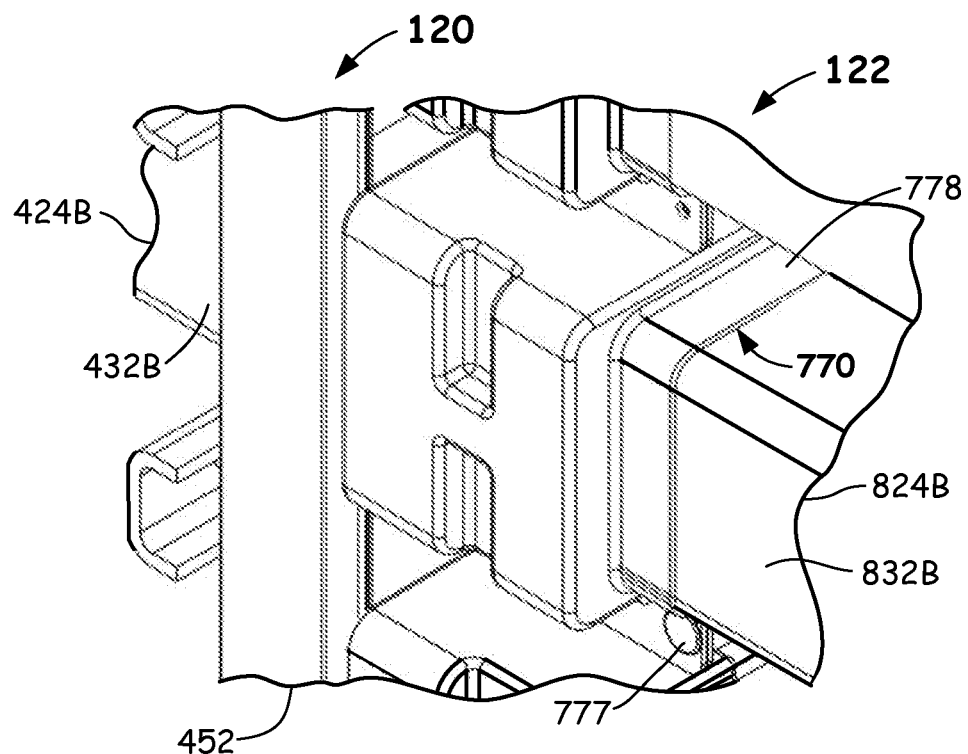
FIG. 8B illustrates a front isometric view of an insulative boot covering a splice of a dual channel conductor according to embodiments.

Reference is now made to FIG. 8B, which illustrates an isometric view of the insulative boot 770 (FIGS. 7A-7B) insulating the splice 880 between the dual channel conductor 424B in the first shipping split 120 and the dual channel conductor 824B in the second shipping split 122. The extension 778 may contact an insulative sleeve 832B on the conductor 824B, wherein the insulative sleeve 832B is substantially similar or identical to the insulative sleeve 432B. The first extension 779A and the second extension 779B may contact the insulative sleeve 432B on the conductor 424B. The insulative cover 452 and components located therein may be received in the gap 780B (FIG. 7B).

It should be readily appreciated that the present disclosure is susceptible of broad utility and application. Many embodiments and adaptations of the present disclosure other than those herein described, as well as many variations, modifications, and equivalent arrangements, will be apparent from, or reasonably suggested by, the present disclosure and the foregoing description thereof, without departing from the substance or scope of the present disclosure. Accordingly, while the present disclosure has been described herein in detail in relation to specific embodiments, it is to be understood that this disclosure is only illustrative and presents examples of the present disclosure and is made merely for purposes of providing a full and enabling disclosure. This disclosure is not intended to be limiting to the particular apparatus, assemblies, systems, and/or methods disclosed, but, to the contrary, the intention is to cover all modifications, equivalents, and alternatives falling within the scope of the claims.

What is claimed is:
1. A power distribution system comprising:
a first conductor having a first conductor end and a first shape in cross-section;

a second conductor having a second conductor end and a second shape in cross-section;
a splice coupling the first conductor end to the second conductor end; and
an insulative boot comprising:
  a first portion moveable relative to a second portion, the insulative boot being in a closed state when the first portion abuts the second portion, and the insulative boot being in an open state when the first portion is spaced from the second portion;
  a first opening at a first end, the first opening having the first shape when the insulative boot is in the closed state, the first opening encompassing the first conductor end when the insulative boot is in the closed state,
  wherein the first shape includes a first concave region, and
  wherein the first end of the insulative boot includes a first flange at least partially filling the first concave region such that the first flange fits within the first concave region when the insulative boot is in the closed state so that the first concave region is made inaccessible to physical contact when the insulative boot is applied to the first conductor;
  a second opening at a second end, the second opening having the second shape when the insulative boot is in the closed state, the second opening encompassing the second conductor end when the insulative boot is in the closed state; and
  a cavity between the first end and the second end, wherein the cavity is configured to encompass the splice when the insulative boot is in the closed state.

2. The power distribution system of claim 1, further comprising a first insulative sleeve having an opening of the first shape and at least partially covering the first conductor end.

3. The power distribution system of claim 2, wherein the first end of the insulative boot contacts at least a portion of the first insulative sleeve when the insulative boot is in the closed state.

4. The power distribution system of claim 2, further comprising a second insulative sleeve having an opening of the second shape and at least partially covering the second conductor end.

5. The power distribution system of claim 4, wherein the first end of the insulative boot contacts at least a portion of the first insulative sleeve and the second end of the insulative boot contacts at least a portion of the second insulative sleeve when the insulative boot is in the closed state.

6. The power distribution system of claim 2, further comprising:
  a brace;
  a sleeve hole extending through the first insulative sleeve;
  a conductor hole extending through the first conductor and aligned with the sleeve hole; and
  a fastener extending from the brace, through the sleeve hole, and through the conductor hole.

7. The power distribution system of claim 6, further comprising a support having a support hole, wherein the brace is located between the support and the insulative sleeve, and wherein the fastener is received in the support hole.

8. The power distribution system of claim 1, wherein:
the first conductor is a dual channel conductor,
the second conductor is a dual channel conductor,
the first shape is a cross-sectional shape of a periphery of the dual channel conductor of the first conductor, and
the second shape is a cross-sectional shape of a periphery of the dual channel conductor of the second conductor.

9. The power distribution system of claim 8, further comprising:
  an insulative sleeve having an opening of the first shape and at least partially covering the first conductor end;
  a first brace;
  a second brace;
  a sleeve hole extending through the insulative sleeve;
  conductor holes extending through channels of the first conductor; and
  one or more fasteners extending between the first brace and the second brace and through the sleeve hole, and through the conductor holes.

10. The power distribution system of claim 1, wherein the first shape and the second shape include a first portion parallel to a second portion and a third portion having a first end connected to the first portion and a second end connected to the second portion.

11. The power distribution system of claim 10, wherein the insulative boot comprises:
  a first tab coupled to the first portion;
  one or more first holes extending through the first tab;
  a second tab coupled to the second portion; and
  one or more second holes extending through the second tab,
  wherein the one or more first holes align with the one or more second holes when the insulative boot is in the closed state.

12. The power distribution system of claim 11, further comprising one or more fasteners received in the one or more first holes and the one or more second holes.

13. The power distribution system of claim 1, wherein the first conductor is a dual channel conductor including a first channel and a second channel, and further comprising a spacer between the first channel and the second channel.

14. The power distribution system of claim 1, wherein the second shape includes a second concave region, and wherein the second end of the insulative boot includes a second flange at least partially filling the second concave region such that the second flange fits within the second concave region when the insulative boot is in the closed state so that the second concave region is made inaccessible to physical contact when the insulative boot is applied to the second conductor.

15. The power distribution system of claim 14, wherein the insulative boot further comprises a first lip extending from the first flange and into the first concave region and a second lip extending from the second flange and into the second concave region.

16. The power distribution system of claim 14, wherein the insulative boot further comprises one or more gussets coupled to the first flange.

17. The power distribution system of claim 1, wherein the first end comprises one or more extensions extending therefrom and a gap between two extensions of the one or more extensions, wherein a support within the power distribution system is received in the gap.

18. An insulative boot configured to cover a splice between a first conductor and a second conductor, the insulative boot comprising:
  a first portion including a first tab;
  one or more first holes extending through the first tab;
  a second portion including a second tab, the second portion being moveable relative to the first portion, the insulative boot being in a closed state when the first tab abuts the second tab and the insulative boot being in an open state when the first tab is spaced from the second tab;

one or more second holes extending through the second tab, the one or more second holes aligning with the one or more first holes when the insulative boot is in the closed state;

a first end;

a first opening located at the first end and having a periphery of a shape of the first conductor in cross-section when the insulative boot is in the closed state, the shape of the first conductor in cross-section including a first concave region;

a first flange extending into the first concave region, wherein the first flange at least partially filling the first concave region such that the first flange fits within the first concave region when the insulative boot is in the closed state so that the first concave region is made inaccessible to physical contact when the insulative boot is applied to the first conductor; and a lip extending from the first flange.

19. The insulative boot of claim 18, further comprising:

a second end opposite the first end;

a second opening located at the second end and having a periphery of a shape of the second conductor in cross-section when the insulative boot is in the closed state, the second shape including a second concave region; and a second flange extending into the second concave region, wherein the second flange at least partially filling the second concave region such that the second flange fits within the second concave region when the insulative boot is in the closed state so that the second concave region is made inaccessible to physical contact when the insulative boot is applied to the second conductor.

* * * * *